United States Patent [19]
Wooden

[11] 3,708,243
[45] Jan. 2, 1973

[54] PLASTIC FAN HUB
[75] Inventor: John A. Wooden, Oaklandon, Ind.
[73] Assignee: Brookside Corporation, McCordsville, Inc.
[22] Filed: Feb. 24, 1971
[21] Appl. No.: 118,379

[52] U.S. Cl. ............... 416/134, 416/244, 287/52.08
[51] Int. Cl. ............................................. F04d 29/20
[58] Field of Search ... 416/134, 244, 241 A; 64/27 R, 64/27 NM; 287/52.08

[56] References Cited

UNITED STATES PATENTS

| | | | |
|---|---|---|---|
| 1,309,675 | 7/1919 | Young et al. | 287/52.08 |
| 2,322,803 | 6/1943 | Koch | 287/52.08 X |
| 2,335,394 | 11/1943 | Devore et al. | 416/241 A |
| 2,614,872 | 10/1952 | Heidegger et al. | 287/52.08 |
| 3,021,049 | 2/1962 | Settle | 416/244 X |
| 3,319,939 | 5/1967 | Rogenski | 416/227 X |
| 3,376,057 | 4/1968 | Van Buren | 416/244 X |
| 3,600,013 | 8/1971 | Doering | 287/52.08 |

Primary Examiner—Everette A. Powell, Jr.
Attorney—Woodard, Weikart, Emhardt & Naughton

[57] ABSTRACT

Disclosed is a hub formed of plastic which carries a fan spider or a blower wheel and has a central bore to accommodate a motor shaft. A cavity is formed in the hub and accommodates a resilient leaf which is threaded on a shaft-engaging set screw extending radially into the central bore. Tightening the set screw on the shaft distorts the resilient member and the internal restoring force thereby exerted by the resilient member holds the hub locked on the shaft despite the normal cold-flow or creep of the hub material.

5 Claims, 3 Drawing Figures

PATENTED JAN 2 1973  3,708,243

INVENTOR
John A. Wooden

BY
Woodard, Weikart, Emhardt & Naughton
ATTORNEYS

PLASTIC FAN HUB

BACKGROUND OF THE INVENTION

In order to minimize the cost of fabrication and assembly of air moving elements such as fans and blower wheels, the use of molded plastic in forming the fan spider or blower wheel, the bladed element, has greatly increased. It is desirable that such plastic fan elements be supported on plastic hubs to facilitate bonding of the fan element and hub, to maintain the light overall weight of the complete assembly and to retain the cost advantage of molded plastic components over metal hubs. Plastic hubs for locking fans or blower wheels on motor shafts have, however, encountered the difficulty that the plastic material from which the hub is molded tends to cold-flow or creep when under prolonged stress and the fan hubs, as a result, eventually loosen on the shaft and failure or noisy operation of the fan or blower assembly results.

The hub embodying the concept of the present invention utilizes a resilient member whose restoring force, when deformed by tightening a set screw against the motor shaft accommodating the hub, serves to compensate for any weakening of the hub-to-shaft locking force caused by creep of the material from which the plastic hub is molded. The hub, and hence the air moving element carried by it, can be loosened and easily removed from the shaft in the field for servicing and repair of the air moving element or to provide access to associated equipment. The construction also reduces considerably the variation in the actual thrust of the set screw against the shaft and the consequent variation in holding power. Set screws are normally set by the assembler to a certain predetermined torque. Variations in threads, finishes, and lubricants can actually cause a many-fold variation of the amount of thrust caused by a set or predetermined torque. This construction minimizes this problem because the physical flattening of the resilient member will give the assembler a definite, easily visible and felt reference or limit point, resulting in less thrust force variation.

DESCRIPTION OF THE PREFERRED EMBODIMENT

Figure 1:
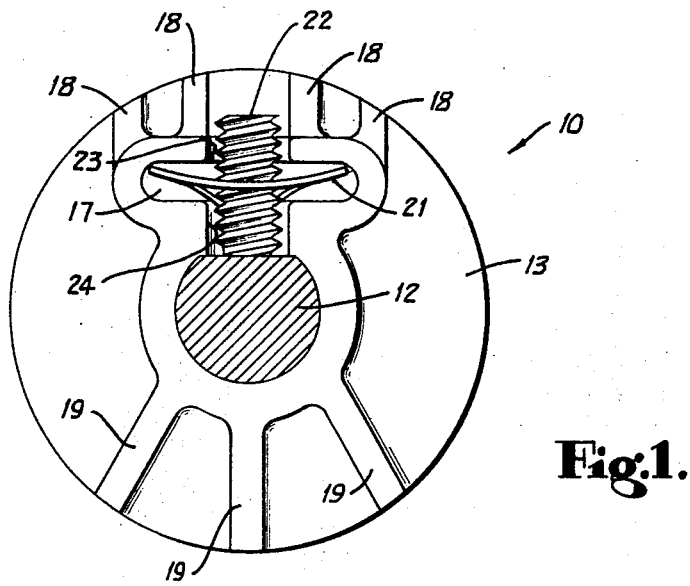
FIG. 1 is an end view of a hub embodying the present invention and shown in place upon a motor shaft.
Figure 2:
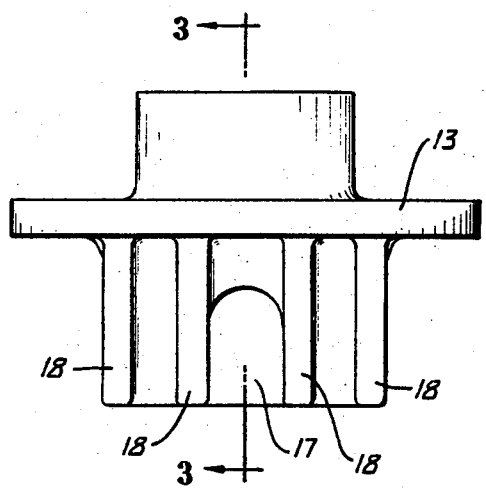
FIG. 2 is a top plan view of the hub shown in FIG. 1 but with the set screw and resilient element omitted.

Referring to the drawings, a plastic hub, indicated generally at 10 is molded or otherwise formed to provide a central bore 11 having a truncated circular configuration, as will be evident from FIG. 1, and which is adapted to accommodate a shaft 12 which may be a conventional motor shaft.

Figure 3:
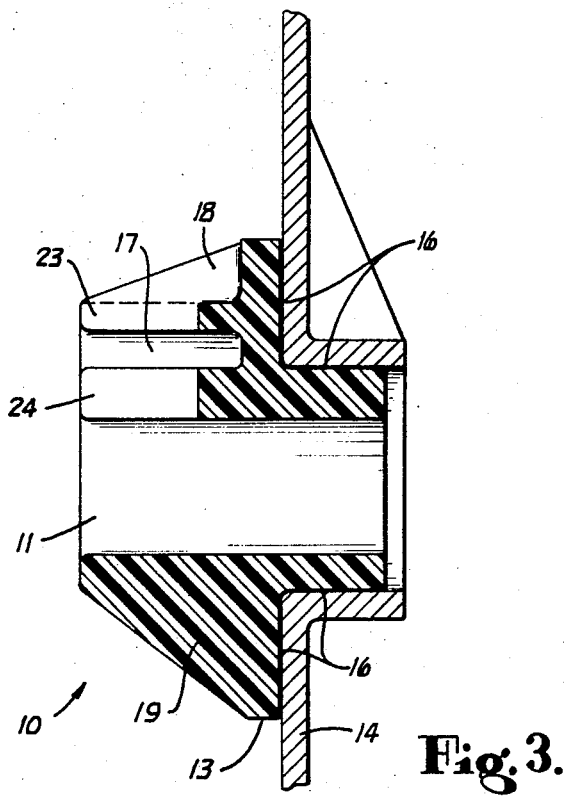
FIG. 3 is a sectional view taken generally along the line 3—3 of FIG. 2, with a fan spider in place on the hub, the fan spider being shown fragmentarily only.

Intermediate its ends, the hub 10 is provided with a radially extending flange 13 as may be seen in FIG. 3. The portion of the hub body adjacent the flange 13 accommodates a driven element such as a fan spider or the end plate of a centrifugal blower wheel fragmentarily indicated at 14. The fan element 14 may be rigidly attached at the engaging surfaces 16 to the hub by solvent or adhesive bonding, or by any other suitable means.

The hub body is provided with a generally rectangular cavity 17 which extends in depth parallel to the longitudinal axis of the central bore in the hub and in width extends transverse to the longitudinal axis of the bore. Tapering gussets 18 extend from the outer surface of the cavity wall to the periphery of the flange 13, and gussets 19 also extend from the portion adjacent the hub bore to the periphery of the flange 13.

As may be seen in FIG. 3, the cavity 17 is open at one end and accommodates a resilient element 21 (FIG. 1) which has a central aperture with portions of the resilient element struck downwardly and given a contour so as to receive the threaded circumference of the set screw 22. The set screw 22 extends freely through registering apertures 23 and 24 in the upper and lower walls of the cavity 17. In unstressed, normal condition the resilient member 21 has a dished or concavo-convex configuration as shown in FIG. 1.

In operation, the fully assembled hub, carrying an air moving element (not shown in FIG. 1) may be slipped upon a motor shaft 12 and the set screw 22 tightened against the flat segment of the shaft. Further turning of the set screw serves to move the central portion of the resilient member 21 upwardly as viewed in FIG. 1, flattening the resilient member against the upper wall of the cavity 17 and storing energy in the deformed or flattened resilient member. The restoring force in the distorted resilient member serves to urge the set screw 22 downwardly against the shaft 12 and is sufficient to maintain a strong locking pressure by the set screw against the shaft despite normal creep or cold-flow of the material of the hub which would otherwise serve to decrease the pressure exerted by the set screw on the shaft. The force stored in the deformed resilient member 21 thus serves to compensate for creep of the material of the plastic hub and maintains the hub locked on the shaft.

It will be noted that the hub of the present invention utilized relatively simple and readily available components such as the set screw and resilient member. Further, it will be understood, that while a fan or other driven element is described being attached to the hub at surfaces 16, the hub might be integrally molded with the driven element.

I claim:

1. A plastic hub for mounting a driven element such as a fan, blower wheel or the like on a motor shaft, said hub comprising a body having a central bore therethrough adapted to receive a motor shaft, said body being formed to provide a cavity extending in depth parallel to the longitudinal axis of said central bore and extending in width transverse to the longitudinal axis of said central bore, a set screw extending radially from said central bore and accommodated in registering apertures in the walls of said cavity, and a resilient member threaded on said set screw and disposed within said cavity, said resilient member having a dished configuration adapted to be distorted into a flattened configuration by engagement with a wall of said cavity as the inner end of said set screw is moved to locking engagement with a shaft accommodated within said central bore, the restoring force exerted by the distorted resilient member serving to maintain the locking engagement of said set screw with the bore-accommodated shaft despite the normal creep of the material from which said hub is formed.

2. A plastic hub as claimed in claim 1 in which said cavity is substantially rectangular and said resilient member extends substantially to the outer side margins of said cavity and is flattened against the cavity wall nearest the periphery of said hub as said set screw is moved into locking engagement with the bore-accommodated shaft.

3. A plastic hub as claimed in claim 1 in which said cavity is open across its width at the end of said hub body to permit insertion of said resilient member into said cavity subsequent to the forming of said hub.

4. A plastic hub as claimed in claim 1 in which a radial annular flange extends from said hub body intermediate the body ends to provide a surface to which a driven element can be attached.

5. A plastic hub as claimed in claim 1 in which said central bore in the hub body is of truncated circular configuration in cross-section with the flat side facing said cavity and in which one of said registering set screw accommodating apertures intersects said flat side of the central bore.

* * * * *